United States Patent Office 3,022,337
Patented Feb. 20, 1962

3,022,337
PROCESS FOR THE CATALYTIC PRODUCTION OF UNSATURATED MONO-CARBOXYLIC ACID ESTERS
Eduard Enk and Fritz Knörr, Burghausen, Upper Bavaria, Germany, assignors to Wacker-Chemie G.m.b.H., Munich, Germany
No Drawing. Filed June 1, 1959, Ser. No. 817,075
Claims priority, application Germany June 3, 1958
10 Claims. (Cl. 260—486)

The present invention relates to an improved catalytic process for dealcoholysis of alpha- or beta-alkoxy or aryloxy substituted mono-carboxylic acid esters to produce unsaturated mono-carboxylic acid esters employing aluminum oxide containing catalysts.

It is known that acrylic esters can be prepared by treating beta-alkoxy propionic acid esters in the liquid or gaseous phase with dehydrating agents, such as sulfuric acid (German Patent No. 573,724). Volatile acidic organic sulfur compounds which reduce the stability of the acrylic acid esters produced were produced as byproducts in such reaction in view of reduction reactions. Furthermore, the yields obtainable were variable in view of losses engendered by polymerization. In the case of acrylic acid methyl ester the yields attained were between 68.5 and 80%.

The production of alpha-beta unsaturated esters by splitting off alcohol from beta-alkoxy substituted propionic or isobutyric acid esters in the liquid phase in the presence of sodium alcoholate has been described in U.S. Patent No. 2,393,737. It has also been proposed to improve the yields and increase the velocity of the reaction by dissolving the sodium methylate employed as the catalyst in methanol and to permit it to drop into the treated beta-methoxy isobutyric acid methyl ester at the same rate as the methacrylic acid methyl ester which is formed distills off. It was possible in this way to achieve yields of up to 92.5% based upon the beta-methoxy isobutyric acid methyl ester converted. However, the separation of a large excess of methanol from the methacrylic acid methyl ester by extractive or azeotropic distillation is rather costly.

In order to increase the velocity of the conversion, the alkaline cleavage of beta-alkoxy substituted esters with the formation of alpha-beta unsaturated esters was carried out in the gas phase according to U.S. Patent No. 2,457,225 employing basic alkali metal and alkaline earth metal compounds as catalysts. The cleavage products obtained are essentially free of acid but in view of the high temperatures required for the dealcoholysis considerable decomposition of the ester formed occurred which is evidenced by the strong yellow brown coloration of the cleavage product and the deposit of carbon on the catalyst which reduced its activity.

According to the invention it was found that unsaturated mono-carboxylic acid esters can be produced by conversion of alpha- or beta-alkoxy or aryloxy substituted mono-carboxylic acid esters employing mixed aluminum oxide containing catalysts which contain an oxide of a metal of group VIA of the periodic system (according to Pauling, College Chemistry, 1955), or aluminum silicate. In the instance the catalysts consist of aluminum oxide and an oxide of a metal of group VIA of the periodic system the main constituent of such catalyst is aluminum oxide. Mixed catalysts, such as aluminum oxide/chromium oxide, aluminum oxide/molybdenum oxide and aluminum oxide/tungsten oxide have proved especially active and the following proportions particularly suitable:

Mixed catalyst of aluminum oxide/chromium oxide containing 2 to 20%, preferably 18–20%, chromium oxide based on the total weight of the catalyst.

Mixed catalyst of aluminum oxide/molybdenum oxide containing 5 to 11%, preferably 8.0–10.9%, molybdenum oxide based on the total weight of the catalyst.

Mixed catalyst of aluminum oxide/tungsten oxide containing 5 to 11%, preferably 8.0–10.9%, tungsten oxide based on the total weight of the catalyst.

The temperatures employed with such catalysts can be between 200 and 400° C., preferably between 300 and 350° C.

In the case of the aluminum silicate containing catalysts, the aluminum silicate is the main component and the content of the aluminum oxide component can be between 0.5 and 20%, preferably 10–13%, based upon the total weight of the catalyst. The temperatures employed with such catalysts can be between 230 and 330° C., preferably about 300° C.

Preferably, the alcohols from which the alkoxy acid ester groups of the starting alkoxy substituted mono-carboxylic acid esters are derived are alkanols containing 1 to 8 carbon atoms.

The following examples will serve to illustrate several embodiments of the process according to the invention.

Example 1

Beta-methoxy propionic acid methyl ester was passed in vapor form at a temperature of 330° C. at a velocity of 0.37 g. per cc. of catalyst per hour over a catalyst consisting of 19.2% $Cr_2O_3$ and 74.8% $Al_2O_3$ (remainder water). The conversion amounted to 70.2% based upon the ether-ester supplied and the yield of acrylic acid ethyl ester was 95.1%. In addition, a 83.5% yield of methanol was obtained based upon the ether-ester converted. The quantity of acrylic acid calculated on acrylic acid+acrylic acid methyl ester was 2.67%. The crude reaction product was almost colorless. No trace of carbon deposit was found on the catalyst. When various sorts of activated aluminum oxides were employed about the same conversion was obtained with yields of 82.0–85.7% of acrylic acid methyl ester and 71.0% of methanol based upon the ether-ester converted.

Example 2

Beta-methoxy isobutyric acid methyl ester was passed in vapor form at a temperature of 330° C. at a velocity of 0.37 g. per cc. of catalyst per hour over a catalyst consisting of 19.2% $Cr_2O_3$ and 74.8% $Al_2O_3$ (remainder water). The conversion amounted to 74.0% based on the ether-ester supplied and the yield of methacrylic acid methyl ester was 95.4%. In addition, an 84.0% yield of methanol was obtained based upon the ether-ester converted.

Example 3

Beta-methoxy isobutyric acid methyl ester was passed in vapor form at a temperature of 300° C. over a catalyst consisting of 85.7% aluminum oxide and 10.2% of molybdenum oxide (remainder water) at the same velocity as employed in Example 2. The conversion amounted to 72.0% based upon the ether-ester supplied and the yield of methacrylic acid methyl ester amounted to 88.1% based upon the ether-ester converted.

Example 4

Beta-n-butoxy propionic acid n-butyl ester was passed in vapor form at a temperature of 290° C. over a catalyst consisting of 8.0% of tungsten oxide and 92% of aluminum oxide at the same velocity as used in Example 2. The conversion amounted to 68.5% based upon the ether-ester supplied and the yield of acrylic acid-n-butyl ester amounted to 87.4% based upon the ether-ester converted.

Example 5

Beta-methoxy propionic acid methyl ester was passed in vapor form at a temperature of 300° C. over a catalyst consisting of 86.7% aluminum silicate and 10.55% aluminum oxide (remainder water) at the same velocity as employed in Example 2. The conversion amounted to 91.0% based upon the ether-ester supplied and the yield of acrylic acid methyl ester amounted to 88.8% based upon the ether-ester converted.

*Example 6*

Beta-methoxy propionic acid n-butyl ester was passed in vapor form at a temperature of 320° C. at a velocity of 0.5 g. per cc. of catalyst per hour over a catalyst consisting of 18.7% of $Cr_2O_3$ and 80.6% $Al_2O_3$ (remainder water). The conversion amounted to 73.0% based upon the ether-ester supplied. The yield of acrylic acid-n-butyl ester was 96% and the yield of methanol was 86% based upon the ether-ester converted.

We claim:

1. A process for the production of α,β-unsaturated monocarboxylic acid esters which comprises contacting a β-alkoxy monocarboxylic acid ester with a catalyst comprising alumina and an oxygen containing compound selected from the group consisting of oxides of metals of group VIA of the periodic system and aluminum silicate at a temperature between 200 and 400° C. to form an α,β-unsaturated monocarboxylic acid ester and an alcohol.

2. The process of claim 1 in which said β-alkoxy monocarboxylic acid ester is a β-alkoxy monocarboxylic acid alkyl ester.

3. The process of claim 1 in which said catalyst essentially consists of aluminum oxide and 2 to 20% of chromium oxide based on the total weight of the catalyst.

4. The process of claim 1 in which said catalyst essentially consist of aluminum oxide and 18 to 20% of chromium oxide based on the total weight of the catalyst.

5. The process of claim 1 in which said catalyst essentially consists of aluminum oxide and 5 to 11% of molybdenum oxide based on the total weight of the catalyst.

6. The process of claim 1 in which said catalyst essentially consists of aluminum oxide and 8 to 10.9% of molybdenum oxide based on the total weight of the catalyst.

7. The process of claim 1 in which said catalyst essentially consists of aluminum oxide and 5 to 11% of tungsten oxide based on the total weight of the catalyst.

8. The process of claim 1 in which said catalyst essentially consists of aluminum oxide and 8 to 10.9% of tungsten oxide based on the total weight of the catalyst.

9. The process of claim 1 in which said β-alkoxy monocarboxylic acid ester is contacted with the catalyst at a temperature between 230 and 330° C. and catalyst essentially consists of aluminum silicate and 0.5 to 20% of aluminum oxide based upon the total weight of the catalyst.

10. The process of claim 1 in which said β-alkoxy monocarboxylic acid ester is contacted with the catalyst at a temperature between 230 and 330° C. and said catalyst essentially consists of aluminum silicate and 10–13% of aluminum oxide based upon the total weight of the catalyst.

References Cited in the file of this patent

UNITED STATES PATENTS

| | | |
|---|---|---|
| 2,376,704 | Kung | May 22, 1945 |
| 2,457,225 | Gresham | Dec. 28, 1948 |

OTHER REFERENCES

Burwell: Chem. Rev. 54, 615–685 (1954) (pp. 622, 628–629, 638, 660 and 672–673 especially relied on).

Fuson: "Advanced Organic Chemistry," 1950, pp. 95–97.

Pauling: "College Chemistry," 1955, inside front cover.

Ehret: "Smith's College Chemistry," 6th edition, 1946, inside rear cover.

Berkaman et al.: "Catalysis," 1940, pp. 735–746.